United States Patent [19]

Rabb

[11] Patent Number: 4,733,902
[45] Date of Patent: Mar. 29, 1988

[54] INSULATIVE LINER ASSEMBLY FOR JEEP-TYPE VEHICLES

[75] Inventor: John Rabb, Van Nuys, Calif.

[73] Assignee: Derek Don Blatt, Van Nuys, Calif.

[21] Appl. No.: 45,418

[22] Filed: May 4, 1987

[51] Int. Cl.⁴ ............................................. B62D 25/00
[52] U.S. Cl. .................................. 296/39 A; 296/214
[58] Field of Search .................. 296/39 A, 39 R, 214, 296/1 R, 136; 135/115

[56] References Cited

U.S. PATENT DOCUMENTS

| | | | |
|---|---|---|---|
| 4,041,999 | 8/1977 | Miller | 296/136 |
| 4,216,989 | 8/1980 | Tackett | 296/136 |
| 4,569,554 | 2/1986 | Dodgen | 296/39 A |
| 4,610,498 | 9/1986 | Tervol | 296/214 |

*Primary Examiner*—Robert R. Song
*Attorney, Agent, or Firm*—John J. Posta, Jr.

[57] ABSTRACT

The improved insulative liner assembly is for use with jeep-type vehicles having canopy roofs and the like. The assembly includes a thermally insulated top panel of quilted cloth, or the like, preferably having a metalized heat reflective layer. The panel is adapted to fit below the vehicle roof canopy and contains hooks or the like to releasably secure it to the transverse roof beams in the vehicle. A pair of thermally insulated rear side panels are connected, preferably releasably by snaps, to the perimeter of the top panel, depend therefrom and bear bunge cords with s hooks or the like at their lower ends to releasably connected them to the interior rear side frame of the vehicle. A thermally insulated rear panel may be similarly connected to the rear of the top panel and bear bunge cords and hooks or the like to hold it in place against the rear interior of the vehicle. Thermally insulated front side panels, each having front and rear portions, are adapted to lap over the side door frames and releasably clip to themselves. One or more of the panels may bear decorative indicia and/or have thermally insulated windows and/or pockets, sleeves, racks or the like. The assembly keeps out the wind and cold and helps to reduce road noise and protect the vehicle occupants.

20 Claims, 6 Drawing Figures

INSULATIVE LINER ASSEMBLY FOR JEEP-TYPE VEHICLES

BACKGROUND OF THE INVENTION

1. FIELD OF THE INVENTION

The present invention generally relates to insulative materials and, more particularly, to an improved thermally insulative liner for jeep-type vehicles.

2. PRIOR ART

Jeeps and jeep-type vehicles in general feature an open top framed in with side and top bars over which a flexible cloth canopy usually bearing windows is releasably disposed. Such vehicles are utilized mainly for military and recreational purposes and in many types of terrain and weather. Such vehicles are notoriously noisy and drafty, becoming very hot in summer and very cold in winter due to the poor fit of the canopy and its low thermal insulative value. Since the canopy offers little safety protection, such vehicles are dangerous in case of vehicular accidents.

There is a need for an improved device which can inexpensively and efficiently reduce the wind and noise in a jeep-type vehicle while increasing its thermally insulative valve both in heat and in cold and protecting its occupants. It would also be desireable if such device could provide the vehicle interior with improved carrying space and decorative appearance.

SUMMARY OF THE INVENTION

The improved insulative liner assembly for jeep-type vehicles satisfies all the foregoing needs. The liner assembly is substantially as set forth in the Abstract. Thus, it comprises a plurality of interconnected, preferably releasably interconnected, thermally insulated panels, including a top panel adapted to fit under the roof canopy of a jeep-type vehicle and be secured around the vehicle's transverse roof beams, a pair of depending rear side panels and/or a rear panel connected to the top panel and releasably connectable by bunge cords and "s" hooks or the like to the interior frame of the vehicle, and a separate pair of front side panels adapted to be wrapped around the lower door frames and be releasably secured to themselves. The panels preferably bear decorative indicia, such as slogans, camoflage, designs or the like, as well as pockets, holders and/or racks to improve the utility thereof.

The panels are of thermally insulative material which is sufficiently effective to increase the interior temperature of the vehicle in cold weather by as much as 42° F., or more over ambient temperature, while providing comparable cooling effects in hot weather. Moreover, the panels substantially reduce noise levels and drafts in the vehicle interior to improve the comfort of the vehicle driver and passengers. Preferably, the panels are detachable from one another for easy storage and are fabricated of light weight material bearing a metallized heat reflective layer. Additionally, the panels serve as cushioning to prevent occupant damage in case of an accident.

Further features of the novel liner assembly are set forth in the following detailed description and accompanying drawings.

DRAWINGS

DETAILED DESCRIPTION

FIGS. 1-5

Now referring more particularly to FIGS. 1-5 of the accompanying drawings, a first preferred embodiment of the novel thermally insulated liner assembly of the present invention is schematically depicted therein. Thus, assembly 10 is shown in detail in FIGS. 2 and 5 and is shown generally as installed in a jeep-type vehicle 12 in FIG. 1.

Figure 3:
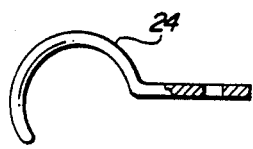
FIG. 3 is a schematic side elevation of a rear hook used in the assembly of FIG. 2.
Figure 4:
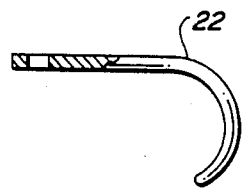
FIG. 4 is a schematic side elevation of a front hook used in the assembly of FIG. 2.

Assembly 10 includes a generally rectangular top panel 14 adapted to fit under the roof canopy 16 of vehicle 12 and to releasably connect to the transverse vehicle front and rear roof beams 18 and 20, respectively, by front and rear hooks 22 and 24, respectively, sewn or otherwise secured to the front and rear ends 26 and 28, respectively, of top panel 14. Details of hooks 22 and 24 are shown in FIGS. 4 and 3, respectively.

Assembly 10 also includes a pair of rear side panels 30 and 32, connected to opposite sides 34 and 36, respectively, of top panel 14 adjacent rear end 28 thereof. Preferably, panels 30 and 32 releasably clip or snap on to sides 34 and 36 for easy assembly, disassembly and storage of assembly 10. Alternatively, they can be permanently joined thereto. Panels 30 and 32 are adapted to depend from top panel 14 and to be pulled taut and releasably secured to the interior rear sides of vehicle 12, as by elastic bunge cords 38 and s-hooks 40 or by equivalent means.

Figure 1:
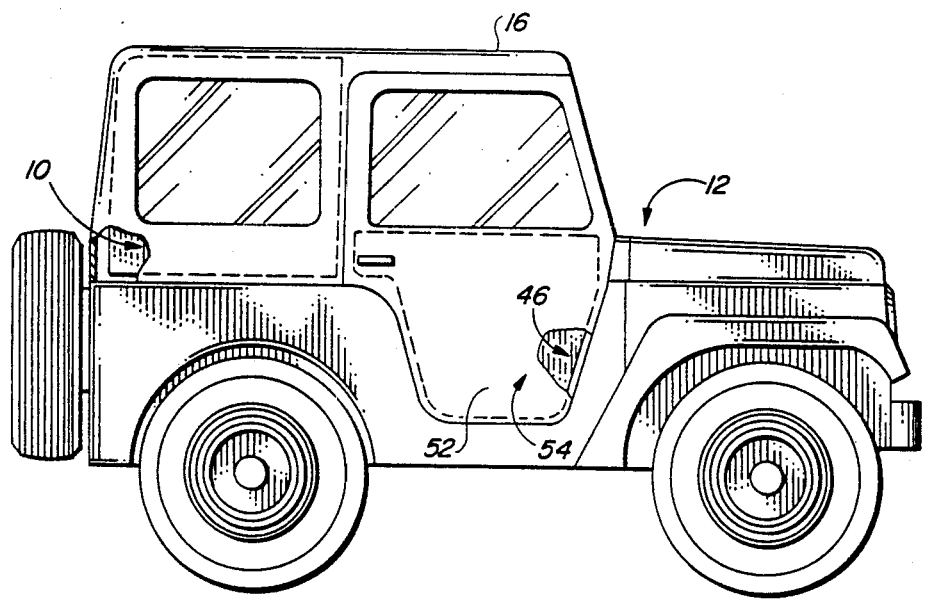
FIG. 1 is a schematic side elevation, partly broken away, of a jeep-type vehicle having the novel insulative liner assembly of the present invention installed therein.
Figure 2:
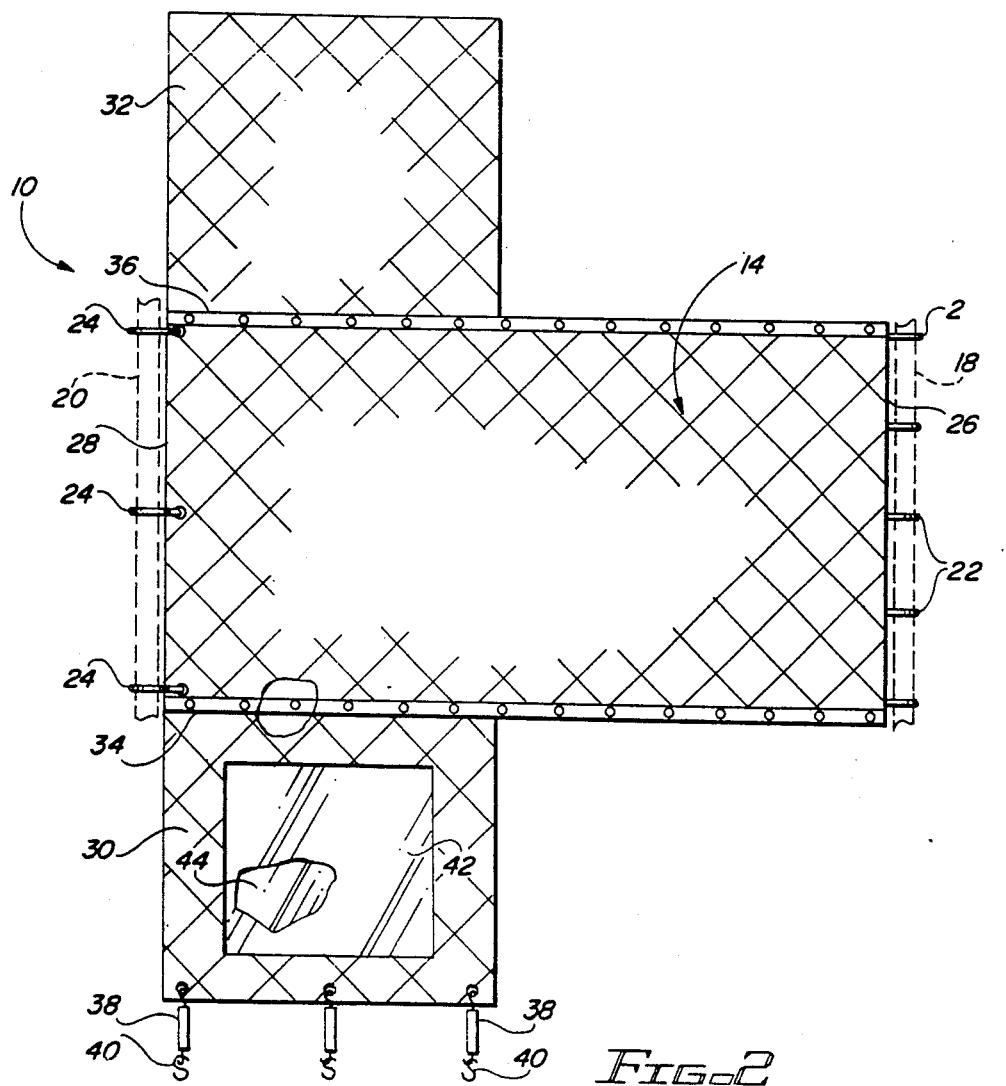
FIG. 2 is a schematic top plan view, partly broken away, of a first preferred embodiment of the liner assembly of the present invention, as illustrated in FIG. 1.

It will be noted that panel 30 bears a thermally insulated window 42, preferably formed of multiple plies 44 of transparent polyethylene, polypropylene or other plastic or the like, while panel 32 is shown in FIG. 2 as windowless, although it also could have a comparable window.

Figure 5:
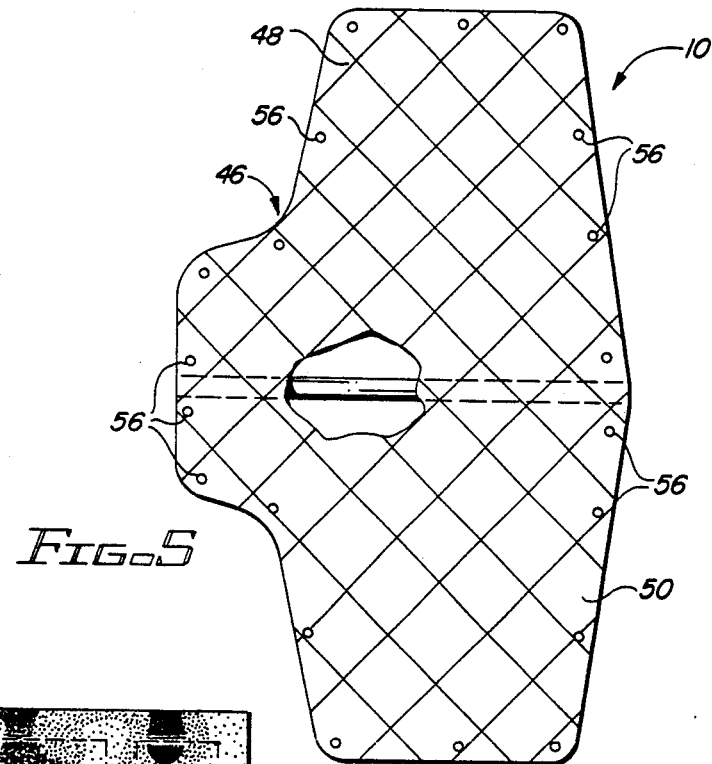
FIG. 5 is a schematic top plan view, partly broken away, of one of the front side panels used in the assembly of FIG. 2; and, FIG. 6 is a schematic bottom plan view, partly broken away, of a second preferred embodiment of the novel insulative liner assembly of the present invention.

Assembly 10 further includes a pair of front side panels 46, one of which is shown in top plan view in FIG. 5. Each panel 46 comprises two identical portions 48 and 50 joined together or formed of a single piece of material. Portions 48 and 50 are adapted to drape over an about horizontal support bar in the interior of the lower portion 52 of door 54 (FIG. 1) and be preferably releasably joined together, as by buttons, snaps, clips 56 or the like. Bunge cords 38 and s-hooks 40 can also be used to hold panels 46 in place.

It will be understood that, if desired, panels 46 could be made to fit the entire interior portion of each door 54, be releasably secured thereto, as by hooks (not shown) and each bear a window therein.

Panels 14, 30, 32 and 46 are fabricated of efficient thermally insulated material such as kapok-filled, or down-filled, quilted plastic, wool, cotton or other cloth and preferably bearing a thin heat-reflecting metallized (aluminized) layer therein. Panels 14, 30, 32 and 46 greatly reduce heat loss, prevent wind, rain, snow and road noise from entering vehicle 12 and act as a safety cushion to prevent occupant injury in case of a vehicle accident. Since those panels effectively serve as a thermal barrier, vehicle 14 is kept cool in summer and warm in winter. Yet assembly 12 is inexpensive, durable and very portable. Hooks 22, 24 and 40 can be plastic or metal and the size of panels 14, 30, 32 and 46 will vary depending on the size of the vehicle interior.

FIG. 6

Figure 6:
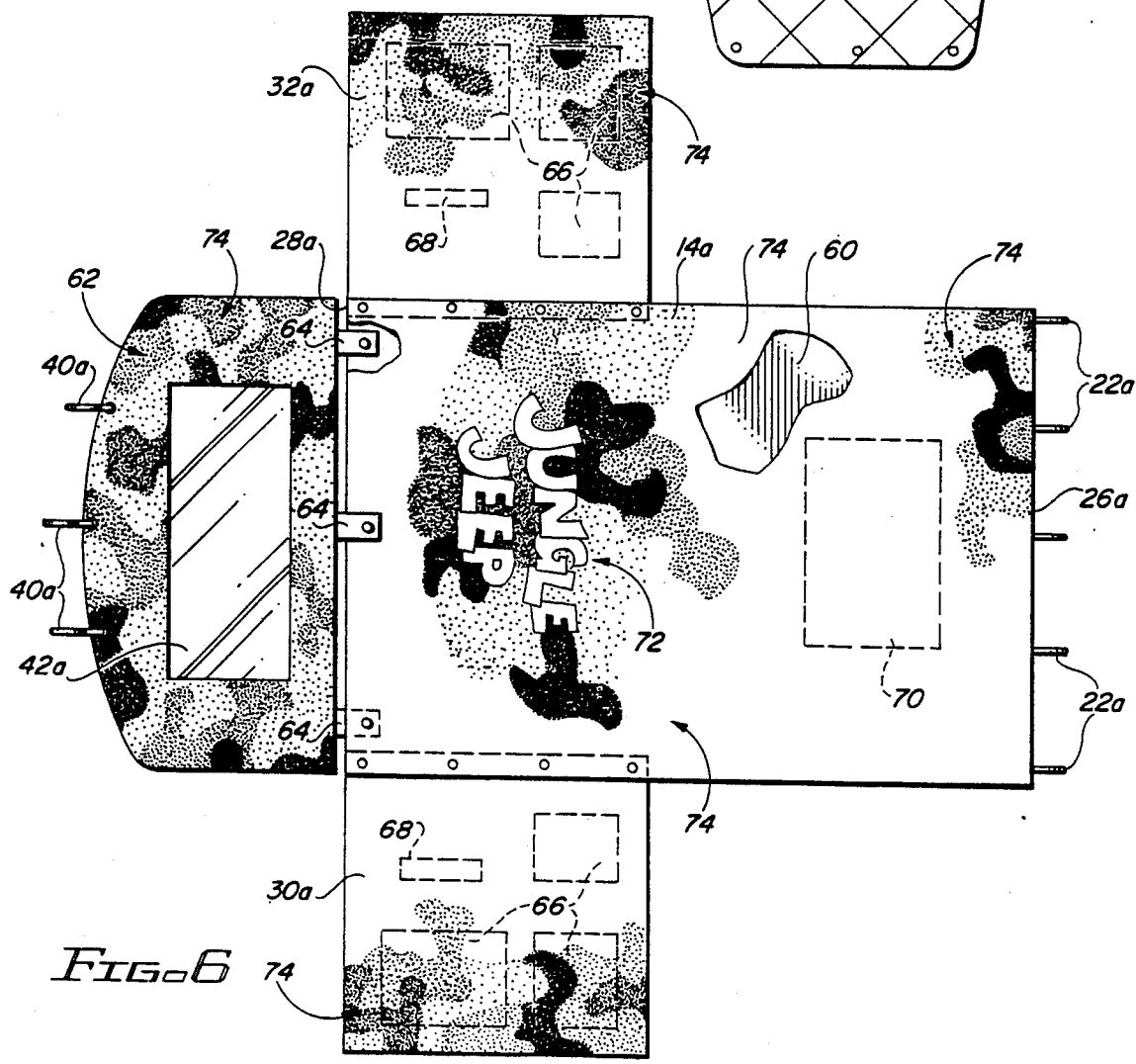

A second preferred embodiment of the improved insulated liner assembly of the present invention is schematically depicted in FIG. 6. Thus, assembly 10a is shown. Components thereof similar to those of assembly 10 bear the same numerals but are succeeded by the letter "a".

Assembly 10a is substantially identical to assembly 10, except for the following:

(a) assembly 10a is non-quilted but bears an aluminized internal layer 60;

(b) a rear panel 62 is provided which is hinged to the rear 28a of top panel 14a by straps 64 and bears hooks 40a on the lower end thereof, as well as a window 42a;

(c) hooks comparable to hooks 24 are absent, since straps 64 bridge the rear transverse roof beam (not shown);

(d) no front side panels are provided;

(e) rear side panels 30a and 32a bear various side pockets generally designated 66 and racks 68, while top panel 14a also has a map pocket 70; and, (f) the surfaces of panels 14a, 30a, 32a, and 62 adapted to face the interior of vehicle 12 are decorated with indicia 72 and designs 74, the latter, for example, depicting jungle camoflage or the like.

Assembly 10a has the advantages of assembly 10 and can be used with front side panels 46 of assembly 10 or comparable panels, if desired.

Various other modifications, changes, alterations and additions can be made in the novel thermally insulated liner assembly of the present invention, its components and parameters. All such changes, modifications, alterations and additions as are within the scope of the appended claims form part of the present invention.

What is claimed is:

1. An improved insulative liner assembly for jeep-type motor vehicles, said liner assembly comprising, in combination:
   (a) a top thermally insulative panel adapted to fit below the roof canopy of a jeep-type vehicle;
   (b) means connected to the front and rear of said top panel to releasably secure said top panel to the transverse support beams in a jeep-type vehicle;
   (c) a pair of thermally insulative rear side panels secured to the rear side margins of said top panel and adapted to depend therefrom; and,
   (d) means connected to the lower portions of said rear side panels for releasably connecting said rear side panels to the interior side frame of a jeep-type vehicle, said assembly being capable of blocking wind, noise and cold from the interior of a jeep-type vehicle.

2. The assembly of claim 1 wherein said assembly includes a pair of thermally insulative front side panels, each of which panels is dimensioned to lap over an interior about a horizontal front door frame bar, each said front side panel having matching front and rear portions bearing connector means to releasably secure said front and rear portions together around said bar.

3. The assembly of claim 1 wherein said assembly includes a thermally insulative rear panel connected to the rear end of said top panel and adapted to depend therefrom, and means connected to the lower portion of said rear panel to releasably secure said rear panel to the rear interior frame of a jeep-type vehicle.

4. The assembly of claim 3 wherein said rear panel includes a thermally insulated window.

5. The assembly of claim 1 wherein at least one of said rear side panels includes a thermally insulated window.

6. The assembly of claim 2 wherein at least one of said top, rear and side panels includes at least one pocket.

7. The assembly of claim 1 wherein said panels comprise quilted thermally insulative material bearing decorative indicia on the surfaces thereof adapted to face the interior of a jeep-type vehicle.

8. The assembly of claim 1 wherein said panels comprise thermally insulative material which includes a metallized heat reflective layer.

9. The assembly of claim 3 wherein said means for releasably securing said top panel, rear and rear side panels comprise hooks.

10. The assembly of claim 3 wherein said rear side panels and said rear panel are releasably connected to the periphery of said top panel for easy assembly, disassembly and storage.

11. A liner for vehicles having a canopy, comprising:
   (a) a cover assembly, including at least one insulative panel adapted to be removeably secured adjacent to and below said canopy,
   (b) releaseable fastening means for securing said panel in a relatively fixed position with respect to said canopy,
   (c) a plurality of side panels having a top portion thereof removeably secured to said insulative panel and adapted to depend therefrom, and
   (d) said side panels having a bottom portion and including means for releasably securing the bottom portion to the interior of said vehicle.

12. The assembly of claim 11 wherein said assembly includes a pair of thermally insulative front side panels, each of which panels is dimensioned to lap over an interior about a horizontal front door frame bar, each said front side panel having matching front and rear portions bearing connector means to releasably secure said front and rear portions together around said bar.

13. The assembly of claim 12 wherein said assembly includes a thermally insulative rear panel connected to the rear end of said top panel and adapted to depend therefrom, and means connected to the lower portion of said rear panel to releasably secure said rear panel to the rear interior frame of a vehicle.

14. The assembly of claim 13 wherein said rear panel includes a thermally insulated window.

15. The assembly of claim 11 wherein at least one of said rear side panels includes a thermally insulated window.

16. The assembly of claim 12 wherein at least one of said top, rear and side panels includes at least one pocket.

17. The assembly of claim 11 wherein said panels comprise quilted thermally insulative material bearing decorative indicia on the surfaces thereof adapted to face the interior of a vehicle.

18. The assembly of claim 11 wherein said panels comprise thermally insulative material which includes a metallized heat reflective layer.

19. The assembly of claim 13 wherein said means for releasably securing said top panel, rear and rear side panels comprise hooks.

20. The assembly of claim 13 wherein said rear side panels and said rear panel are releasably connected to the periphery of said top panel for easy assembly, disassembly and storage.

* * * * *